(12) United States Patent
Yang et al.

(10) Patent No.: US 9,660,465 B2
(45) Date of Patent: May 23, 2017

(54) UNINTERRUPTIBLE POWER SUPPLY, BATTERY ASSEMBLY THEREOF AND CHARGING-DISCHARGING METHOD THEREOF

(71) Applicant: DELTA ELECTRONICS, INC., Taoyuan County (TW)

(72) Inventors: Yung-Hung Yang, Taoyuan County (TW); Chia-Hou Liao, Taoyuan County (TW); Kun-Hao Su, Taoyuan County (TW)

(73) Assignee: DELTA ELECTRONICS, INC. (TW)

( * ) Notice: Subject to any disclaimer, the term of this patent is extended or adjusted under 35 U.S.C. 154(b) by 330 days.

(21) Appl. No.: 14/624,784

(22) Filed: Feb. 18, 2015

(65) Prior Publication Data
US 2016/0111897 A1    Apr. 21, 2016

(30) Foreign Application Priority Data

Oct. 15, 2014    (TW) .............................. 103135639 A (51) Int. Cl.
*H02J 7/00* (2006.01)
*H02J 9/06* (2006.01)

(52) U.S. Cl.
CPC .............. *H02J 7/0042* (2013.01); *H02J 9/06* (2013.01)

(58) Field of Classification Search
CPC .............................. H02J 7/0029; H02J 7/0036
See application file for complete search history.

(56) References Cited

U.S. PATENT DOCUMENTS

| 8,970,165 B2 * | 3/2015 | Wada ................. H02J 7/0045 320/106 |
| 2013/0202930 A1 * | 8/2013 | Kumagai ........... B60L 11/1855 429/91 |

* cited by examiner

*Primary Examiner* — Jeffrey Zweizig
(74) *Attorney, Agent, or Firm* — Hauptman Ham, LLP (57) ABSTRACT

A battery assembly includes a power module, a receptacle connector, a driving switch and a movable stop arm. The power module includes a battery control unit and a cell electrically connected to the battery control unit. The receptacle connector is disposed at the power module and electrically connected to the cell via the battery control unit. The receptacle connector includes an insertion opening. The driving switch is disposed corresponding to the receptacle connector and electrically connected to the battery control unit. A default setting of the driving switch is "switched off". One end of the movable stop arm is outside of the insertion opening and blocks the same. The movable stop arm is movable toward the driving switch to touch and switch on the same.

19 Claims, 10 Drawing Sheets

UNINTERRUPTIBLE POWER SUPPLY, BATTERY ASSEMBLY THEREOF AND CHARGING-DISCHARGING METHOD THEREOF

BACKGROUND

1. Technical Field

The present invention relates to an uninterruptible power supply and, in particular, to an uninterruptible power supply, a battery assembly thereof, and a charging-discharging method thereof.

2. Related Art

In order to maintain continuous operation of server equipment, the server equipment nowadays is usually equipped with an uninterruptible power supply (UPS). When the electrical power supplied to the server equipment is interrupted, the UPS provides a backup power supply to the server equipment.

The conventional UPS usually includes a host computer and a battery. The host computer is electrically connected to the main power source, the server equipment, and the battery. When the main power source is normal, the host computer distributes the power supplied from the main power source for operation of the server equipment and electrical charging of the battery. When the main power source is interrupted, the host computer conveys the electrical power stored in the battery to the server equipment for uninterrupted operation.

The conventional UPS battery is a lead-acid battery which has shortcomings such as being large and having a short lifespan. In order to overcome the shortcomings, a lithium battery can be used to replace the lead-acid battery, and plural lithium batteries can be disposed to increase the power capacity. However, the conventional lead-acid battery has a single standard voltage, so the circuit layout for electrical charging is simple, but the lithium battery can generate different voltages depending on the number of its cells. Therefore, different lithium batteries may be unsuitable for connecting the host computer. The conventional UPS battery has no mechanisms for charging or discharging in advance. Therefore, connecting an incompatible lithium battery may cause overcharging and therefore result in burning.

In view of the foregoing, the inventor made various studies to overcome the above-mentioned problems to realize the improvements, on the basis of which the present invention is accomplished.

BRIEF SUMMARY

The present invention provides an uninterruptible power supply capable of being driven in advance, a battery assembly thereof, and a charging-discharging method thereof.

The present invention provides a battery assembly which comprises a power module, a receptacle connector, a driving switch, and a movable stop arm. The power module includes a battery control unit and a cell electrically connected to the battery control unit. The battery control unit controls charging or discharging of the cell. The receptacle connector includes an insertion opening. The receptacle connector is disposed at the power module and electrically connected to the cell via the battery control unit for charging or discharging of each of the cells. The driving switch is switched off in its default setting. The driving switch is disposed corresponding to the receptacle connector and electrically connected to the battery control unit. The battery control unit is driven to disconnect the electrical connection between the battery control unit and the cell when the driving switch is touched to switch on. One end of the movable stop arm is outside of the insertion opening and blocks the same. The movable stop arm is movable toward the driving switch to touch and switch on the driving switch.

It is preferable that the other end of the movable stop arm is fixed to the power module so as to restrict the movable stop arm to be movable between the insertion opening and the driving switch, and the movable stop arm is so resilient as to be restorable to its initial position outside the insertion opening to block the same. The battery control unit is driven to disconnect the electrical connection between the cell and the receptacle when the driving switch is switched on. The present invention may include plural receptacle connectors and plural driving switches. Each of the receptacle connectors is electrically connected to the cell via the battery control unit, and each of the driving switches is disposed corresponding to a respective one of the receptacle connectors and electrically connected to the battery control unit.

The present invention provides an uninterruptible power supply for connection between an electronic apparatus and a main power source. The uninterruptible power supply comprises a power module, a receptacle connector, a driving switch, a movable stop arm, a power wire, and a host computer. The power module includes a battery control unit and a cell electrically connected to the battery control unit. The battery control unit controls charging or discharging of the cell. The receptacle connector includes an insertion opening. The receptacle connector is disposed at the power module and is electrically connected to the cell via the battery control unit for the charging or discharging of each of the cells. The driving switch is switched off in its default setting. The driving switch is disposed corresponding to the receptacle connector and is electrically connected to the battery control unit. The battery control unit is driven to disconnect the electrical connection between the battery control unit and the cell when the driving switch is switched on. One end of the movable stop arm is outside of the insertion opening and blocks the same. The movable stop arm is movable toward the driving switch to touch and switch on the driving switch. One end of the power wire includes a plug connector adapted for insertion into the receptacle connector. The host computer is electrically connected to the electronic apparatus and the main power source. The other end of the power wire is electrically connected to the host computer. The host computer manages electrical power distribution among the main power source, the electronic apparatus, and the power module.

It is preferable that the other end of the movable stop arm is fixed to the power module so as to restrict the movable stop arm to be movable between the insertion opening and the driving switch, and the movable stop arm is so resilient as to be restorable to its initial position outside the insertion opening to block the same. When the driving switch is switched on, the battery control unit is driven to disconnect the electrical connection between the cell and the receptacle connector. The uninterruptible power supply may comprise plural receptacle connectors and plural driving switches. Each of the receptacle connectors is electrically connected to the cell via the battery control unit, and each of the driving switches is disposed corresponding to a respective one of the receptacle connectors and is electrically connected to the battery control unit. A lug is protrudingly disposed at a side surface of the plug connector, and when the plug connector is inserted into the receptacle connector, the lug pushes against the movable stop arm to switch on the driving switch. A through hole for insertion of a screw is formed on the lug, so as to screw the plug connector to the power module. The cell is preferably a lithium cell.

It is preferable that the uninterruptable power supply further comprises a signal line connected to the battery control unit and the host computer. The signal line is provided for the battery control unit to obtain the voltage state of the host computer. The battery control unit controls each of the cells to perform charging or discharging based on the voltage state of the host computer.

The present invention provides a charging-discharging method of a battery assembly. The charging-discharging method comprises steps as follows: providing a power module, a receptacle connector, a driving switch, and a movable stop arm, the power module comprising a battery control unit and a cell electrically connected to the battery control unit, the receptacle connector being electrically connected to the cell via the battery control unit, the driving switch being electrically connected to the battery control unit, the driving switch being switched off in its default setting; detecting an ON-OFF state of the driving switch by means of the battery control unit; disconnecting the electrical connection between the receptacle connector and the cell; adjusting the voltage state of the cell by means of the battery control unit; and switching the receptacle connector and the cell into the ON state by means of the battery control unit.

It is preferable that in the step a, a host computer, a power wire, and a signal line are provided. One end of the power wire is electrically connected to the host computer. The other end of the power wire includes a plug connector for insertion into the receptacle connector. The signal line is electrically connected to the battery control unit and the host computer. The voltage state of the host computer is obtained via the signal line, and the voltage state of the cell is adjusted to match the voltage state of the host computer based on the voltage state of the host computer. One end of the movable stop arm blocks the receptacle connector and is movable toward the driving switch to touch and switch on the driving switch. The movable stop arm is so resilient as to be restorable to its initial position to block the receptacle connector.

The charging-discharging method further comprises steps as follows: moving the movable stop arm away from the receptacle connector to touch and switch on the driving switch, and inserting the plug connector into the receptacle connector and pushing against the movable stop arm by the plug connector to maintain the driving switch in the ON state, so as to electrically connect the host computer to the cell.

According to the uninterruptible power supply, the battery assembly thereof, and the charging-discharging method of the present invention, the circuit is adjusted to a suitable state before the plug connector inserts into the battery assembly, thereby preventing the cell from being damaged by improper charging.

DETAILED DESCRIPTION

Figure 1:
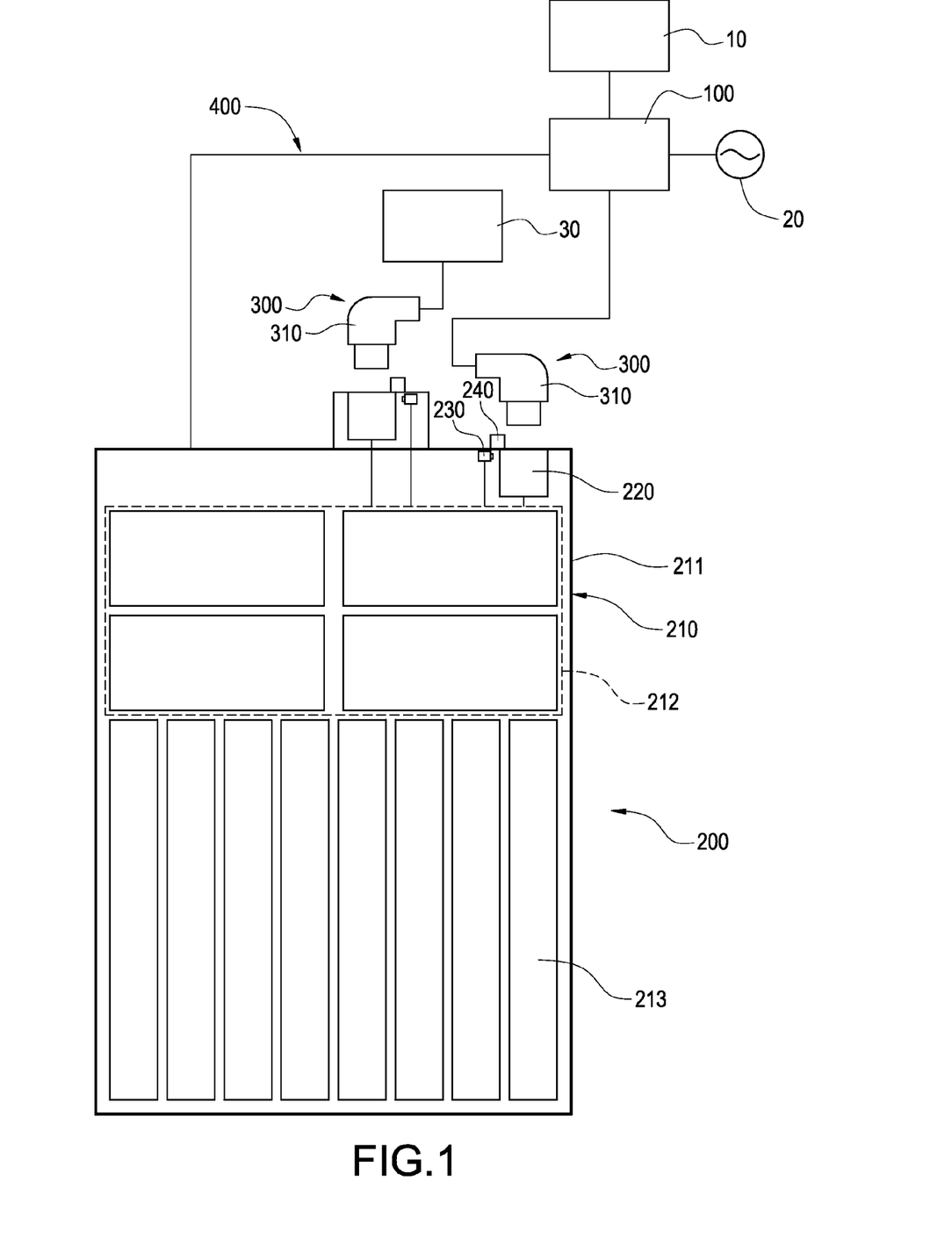
FIG. 1 is a schematic view of an uninterrupted power supply according to a first embodiment of the present invention.
Figure 2:
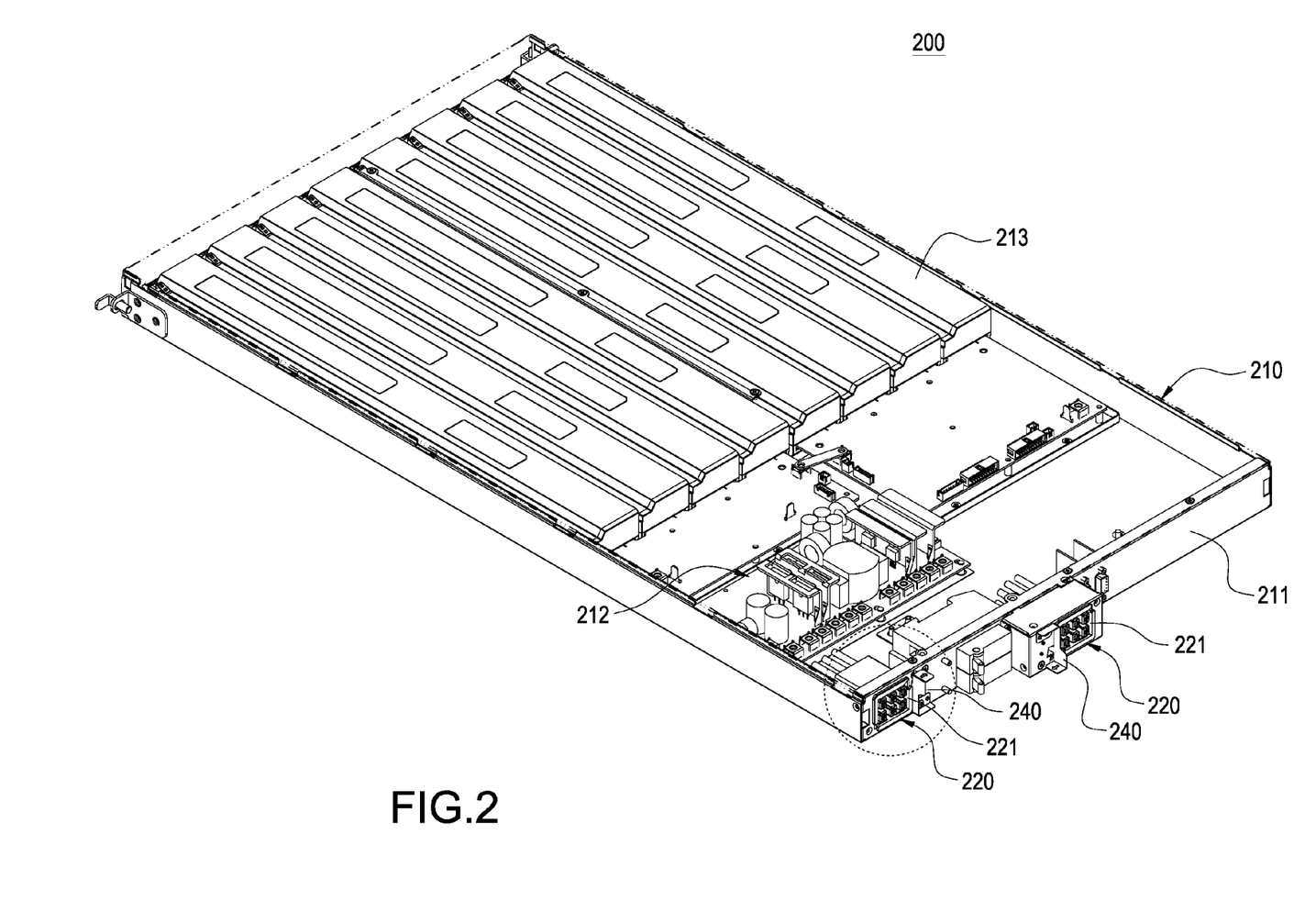
FIG. 2 is a perspective view of a battery assembly according to the first embodiment of the present invention.

Referring to FIGS. 1 and 2, a first embodiment of the present invention provides an uninterrupted power supply for connection between an electronic apparatus 10 (e.g. a server) and a main power source 20. The uninterrupted power supply comprises a host computer 100, a battery assembly 200, a power wire 300, and a signal line 400. The host computer 100 is electrically connected to the electronic apparatus 10 and the main power source 20, and is electrically connected to the battery assembly 200 by means of the power wire 300, thereby managing the electrical power distribution for the operation of the electronic apparatus 10 and charging/discharging of the battery assembly 200. According to the present embodiment, the battery assembly 200 comprises a power module 210, at least one receptacle connector 200, at least one driving switch 230, and at least one movable stop arm 240.

According to the present embodiment, it is preferable that the power module 210 includes a housing 211, a battery control unit 212, and a plurality of cells 213 electrically connected to the battery control unit 212. The cell 213 is preferably a lithium cell. The battery control unit 212 and the cell 213 are accommodated in the housing 211. The battery control unit 212 is capable of adjusting the voltage state of the cells 213 according to a charging or discharging demand. The present invention does not limit the number of the cells 213 in the power module 210.

Figure 3:
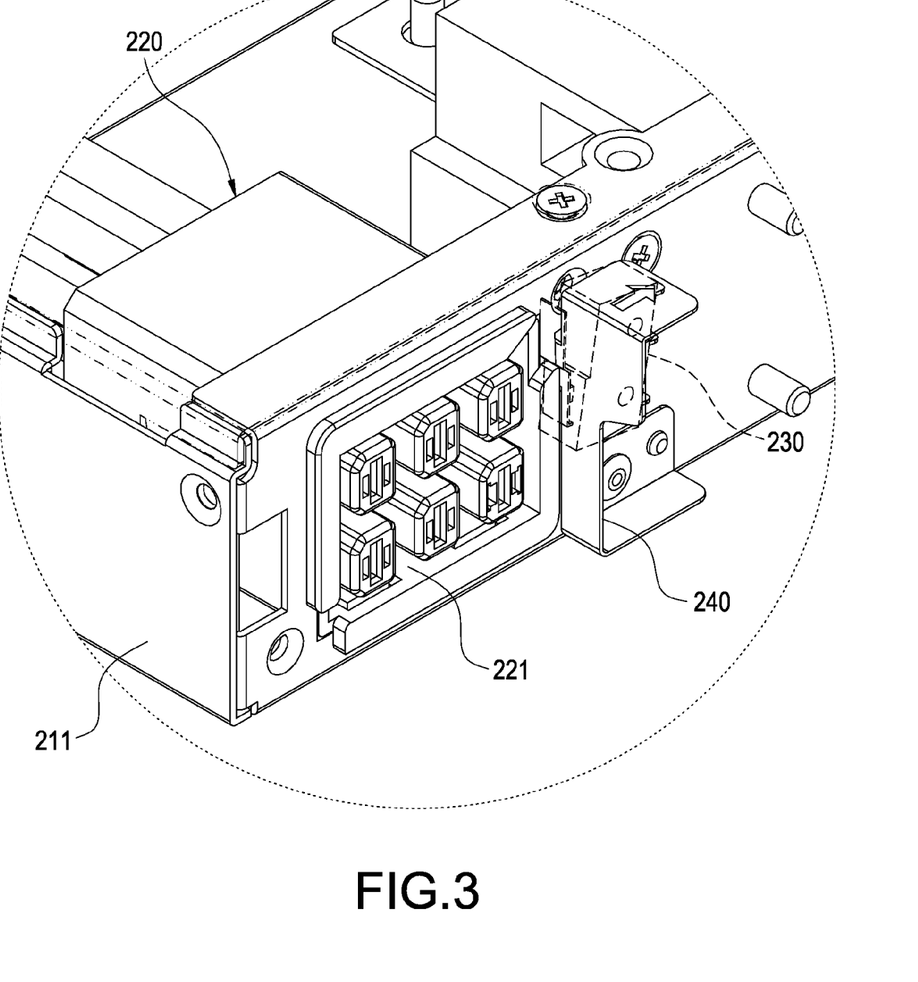
FIG. 3 is a partially enlarged view of the battery assembly according to the first embodiment of the present invention.
Figure 4:
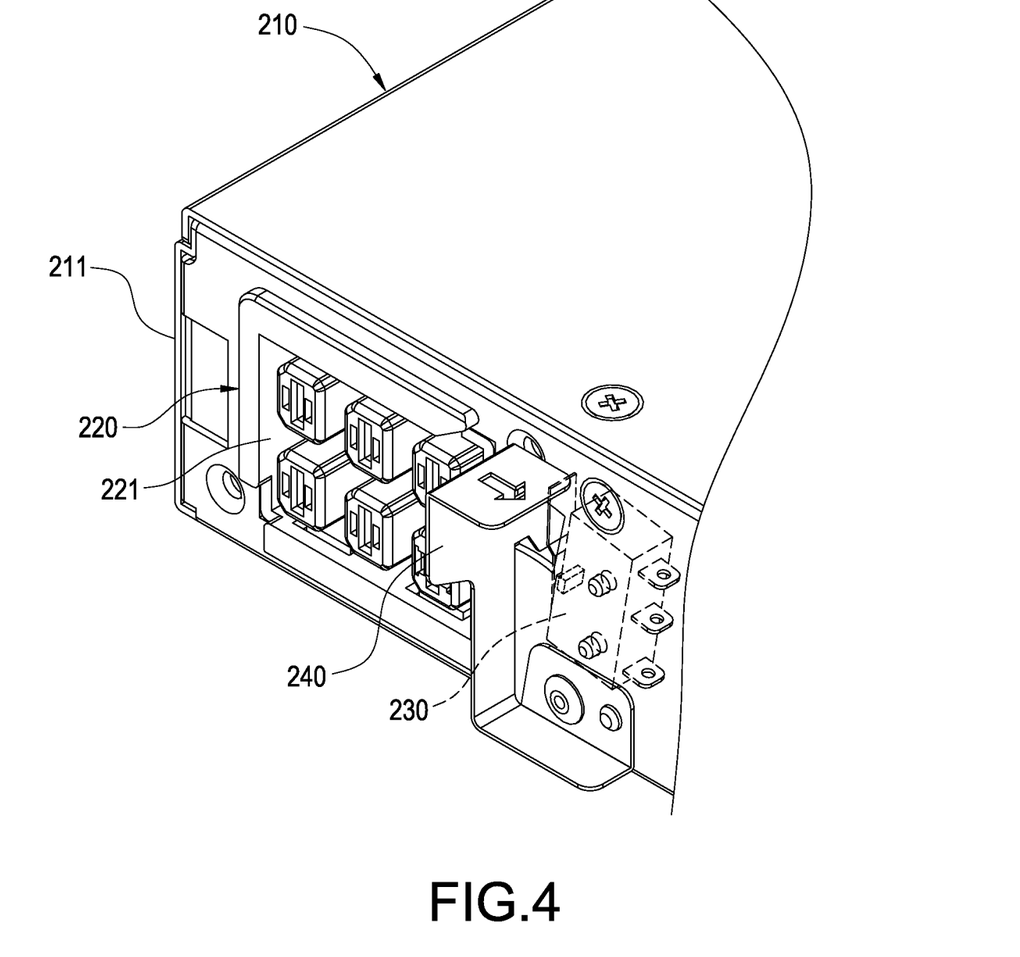
FIG. 4 is another partially enlarged view of the battery assembly according to the first embodiment of the present invention.

Referring to FIGS. 3 and 4, the receptacle connector 220 is disposed on the housing 211 of the power module 210. According to the present embodiment, the power module 210 preferably includes two receptacle connectors 220. Each of the receptacle connectors 220 has an insertion opening 221, is electrically connected to the battery control unit 212, and is electrically connected to each of the cells 213 via the battery control unit 212.

According to the present embodiment, the driving switch 230 is switched off in its default setting. The driving switch 230 is screwed to the housing 211 and is disposed at one side of the insertion opening 221 of the receptacle connector 220. The driving switch 230 is electrically connected to the battery control unit 212. The battery control unit 212 is driven to disconnect the electrical connection between the cell 213 and the receptacle connector 220 when the driving switch 230 is switched on.

According to the present embodiment, the movable stop arm 240 is a resilient arm formed by bending an elongated metal sheet. One end of the movable stop arm 240 is screwed onto the housing 211 of the power module 210. The other end of the movable stop arm 240 extends to a position outside of the insertion opening 221 of the receptacle connector 220 and blocks the insertion opening 221, thereby restricting the movable stop arm 240 to be movable between the insertion opening 221 and the driving switch 230. The movable stop arm 240 can be pushed to move toward the driving switch 230 to touch and switch on the driving switch 230. Since the movable stop arm 240 is resilient, it restores to its original position outside the insertion opening 221 and blocks the same. The above-mentioned is a preferable embodiment of the present invention; however, the present invention is not limited thereto. For example, the movable stop arm 240 can also be pivotally connected to the housing 211 of the power module 210, and a restoring element (e.g. a spring) is disposed at a pivot of the movable stop arm 240, so that the movable stop arm 240 is restorable to its initial position to block the insertion opening 221 upon release of the movable stop arm 240.

Figure 5:
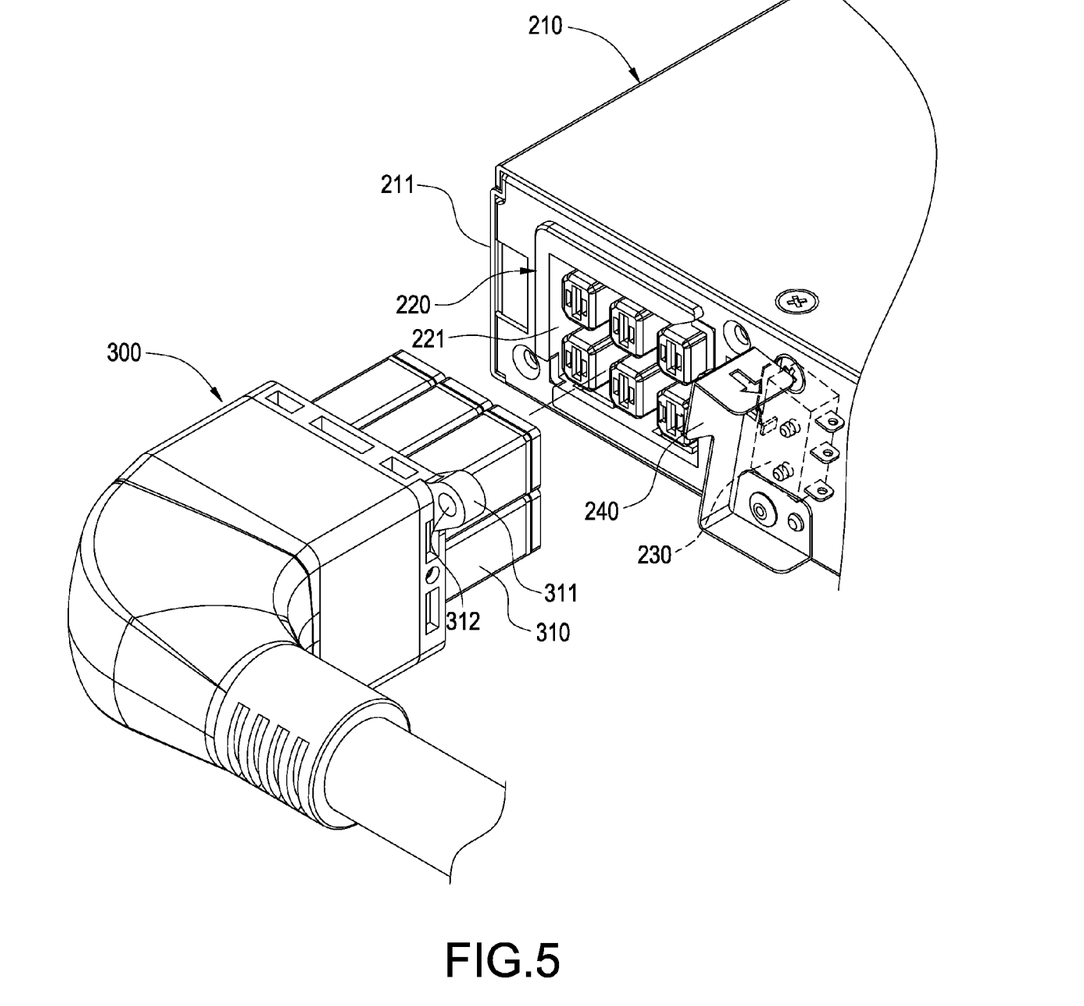
FIG. 5 is a schematic view of a plug connector according to the first embodiment of the present invention.

Referring to FIGS. 1, 2, and 5, one end of the power wire 300 includes a plug connector 310 for insertion into any receptacle connector 220. The other end of the power wire 300 is electrically connected to the host computer 100 or another backup battery 30. According to the embodiment, the power module 210 includes two receptacle connectors 220 disposed thereon, thereby allowing insertion of another power wire 300 which can be electrically connected to the another backup battery 30.

Figure 6:
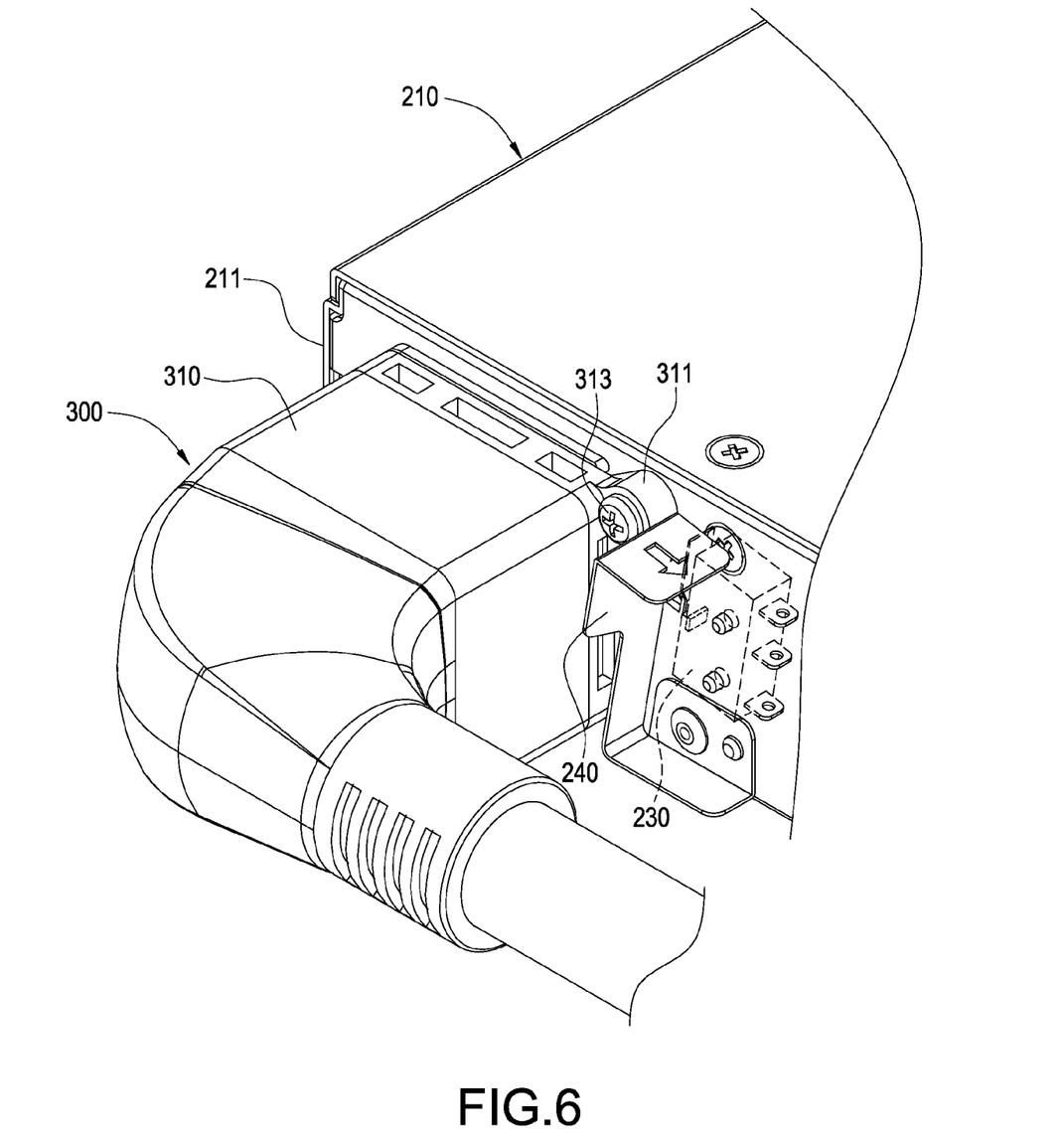
FIG. 6 is a schematic view illustrating the insertion of the plug connector of FIG. 5.
Figure 7:
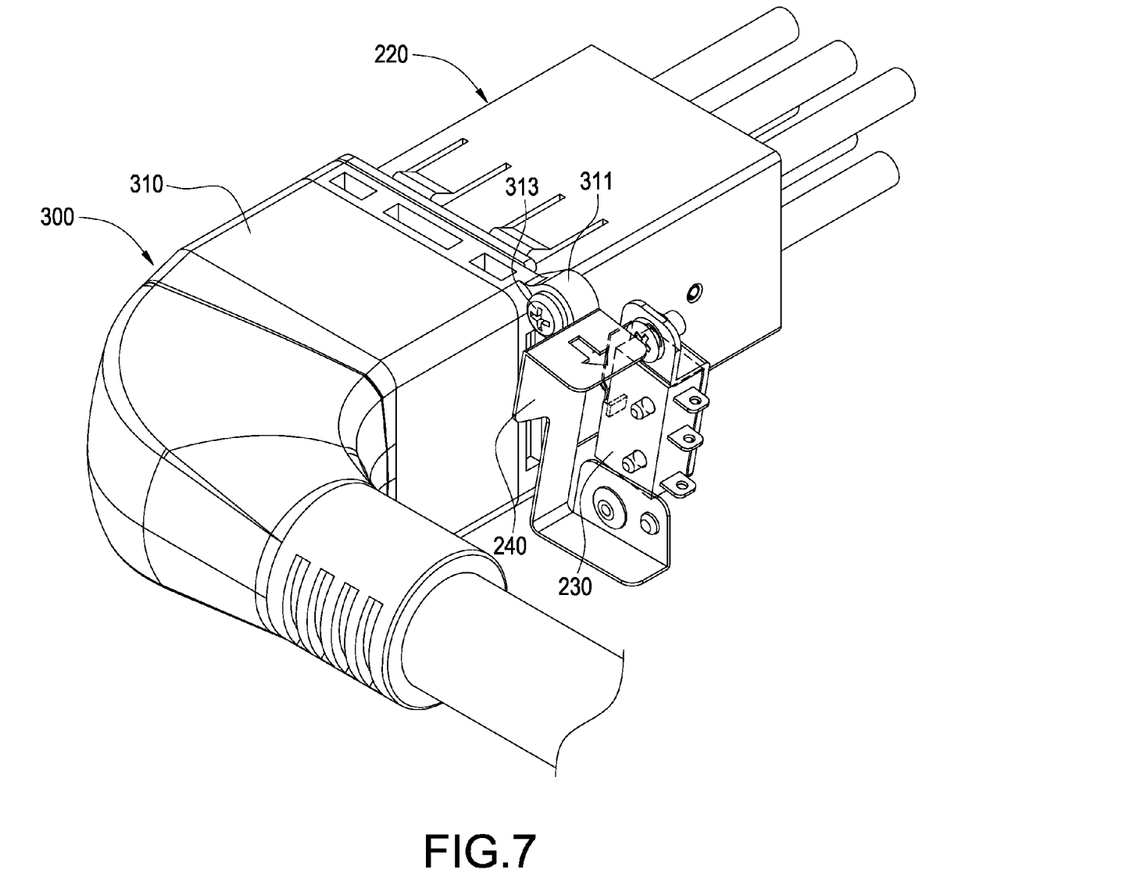
FIG. 7 is another schematic view illustrating the insertion of the plug connector of FIG. 5.
Figure 8:
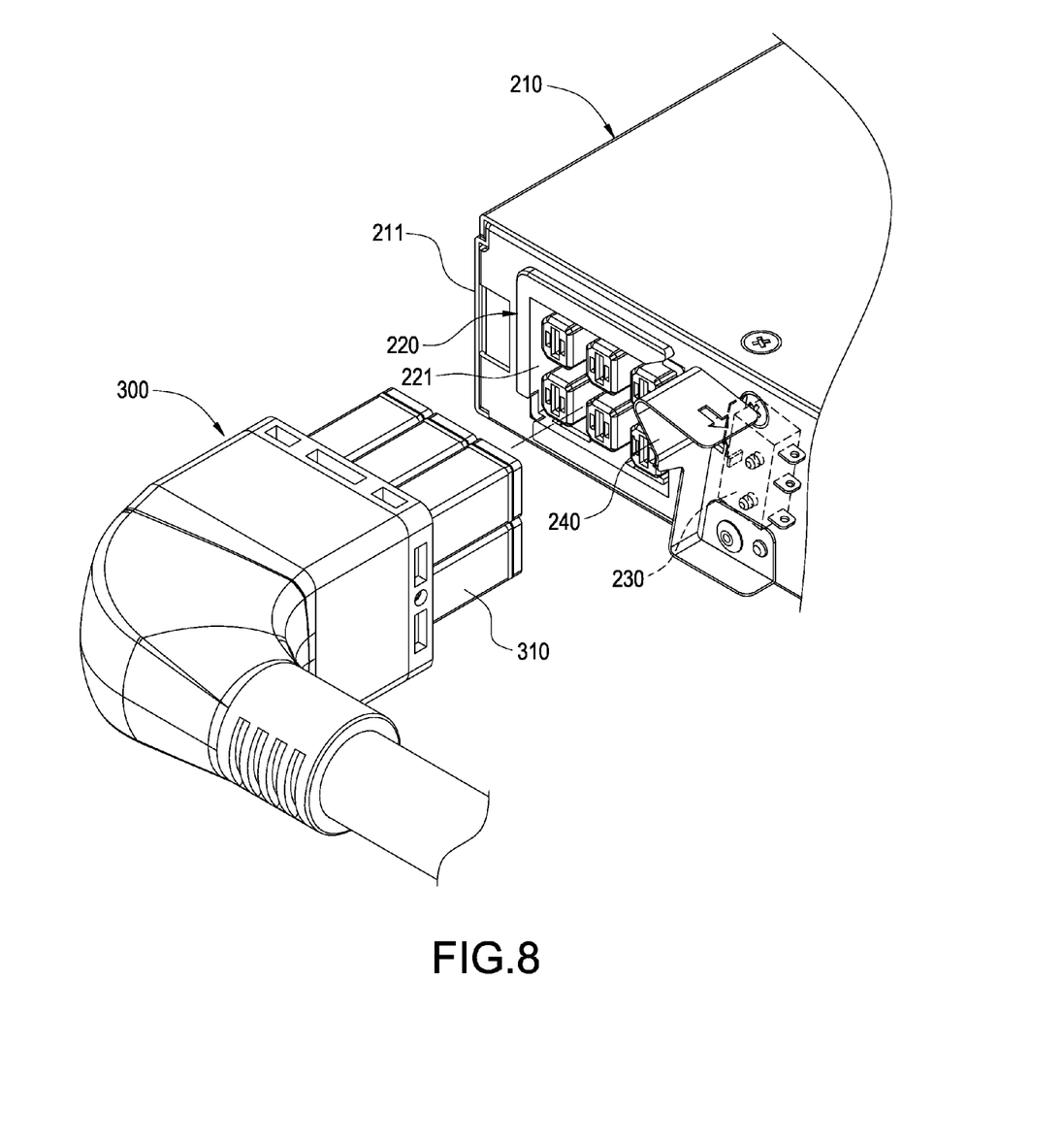
FIG. 8 is a schematic view of another kind of plug connector according to the first embodiment of the present invention.
Figure 9:
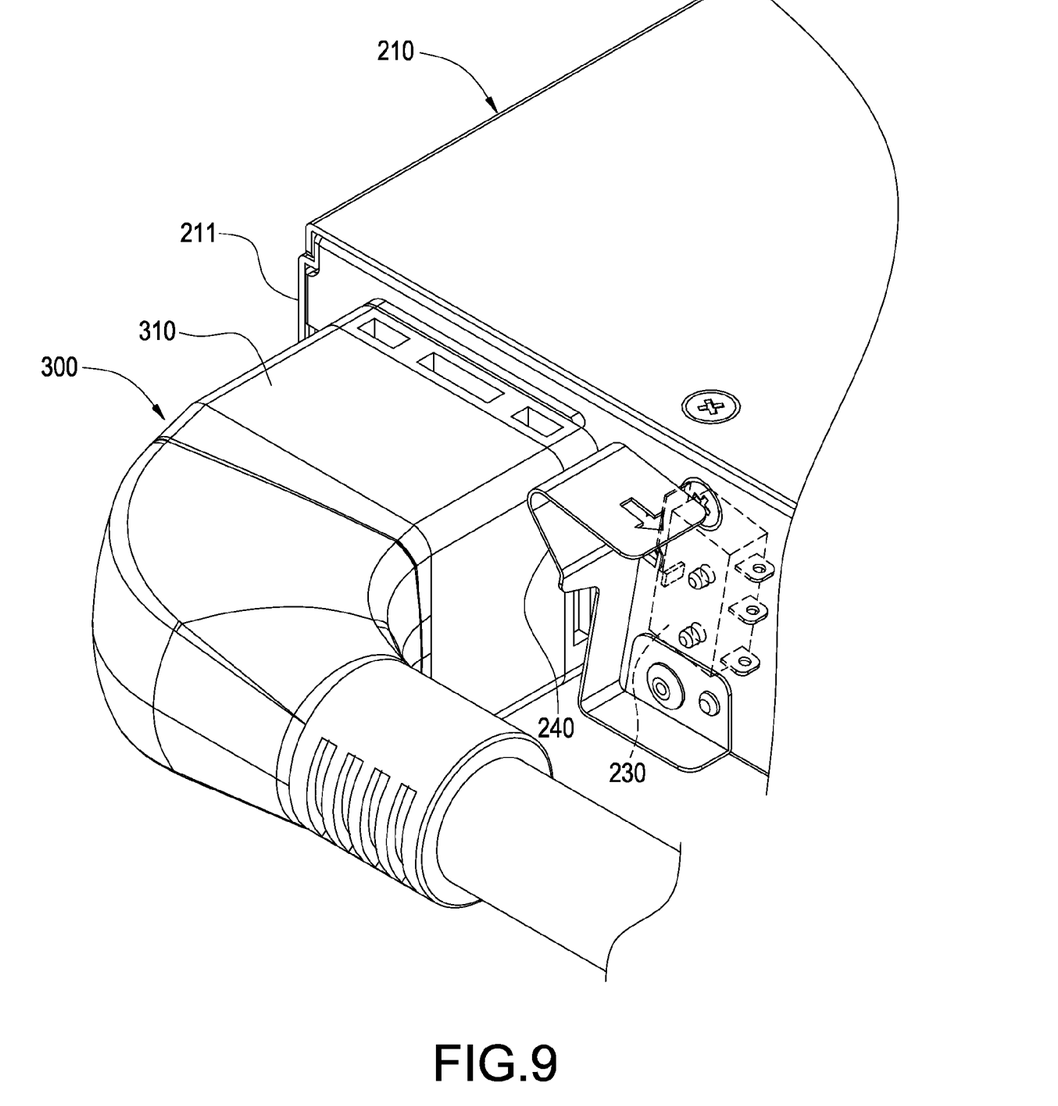
FIG. 9 is a schematic view illustrating the insertion of the plug connector of FIG. 8.

Referring to FIGS. 5 to 7, in the present embodiment, a lug 311 is protrudingly disposed at a side surface of the plug connector 310, and when the plug connector 310 is inserted into the receptacle connector 220, the lug 311 pushes against the movable stop arm 240 to keep the driving switch 230 switched on. A through hole 312 for insertion of a screw 313 is formed on the lug 311, so as to screw the plug connector 310 to the housing 211 of the power module 210, thereby preventing loosing. The above-mentioned is a preferable embodiment of the plug connector 310; however, the present invention is not limited thereto. For example, the plug connector 310 can have no lug 311, as shown in FIG. 8 and FIG. 9. The plug connector 310 pushes against, by its own structure, the movable stop arm 240. Preferably, the movable stop arm 240 can be bent to form a suitable shape, according to a relative position between the movable stop arm 240 and the plug connector 310, so as to facilitate being pushed by the plug connector 310.

Referring to FIG. 1, the signal line 400 is electrically connected to the battery control unit 212 and the host computer 100, and the signal line 400 is used for signal communication between the host computer 100 and the battery control unit 212. The battery control unit 212 obtains the voltage state of the host computer 100 via the signal line 400, and adjusts the voltage state of the cells 213 to match the voltage state of the host computer 100.

Referring to FIGS. 1, 2, 5, and 10, the uninterruptible power supply is connected between the electronic apparatus 10 (e.g. server equipment) and a main power source 20. When the main power source 20 is normal, the host computer 100 distributes the electrical power for operation of the electronic apparatus 10 and charging of the battery assembly 200. A second embodiment of the present invention provides a charging-discharging method of a battery assembly, which comprises the following steps.

Figure 10:
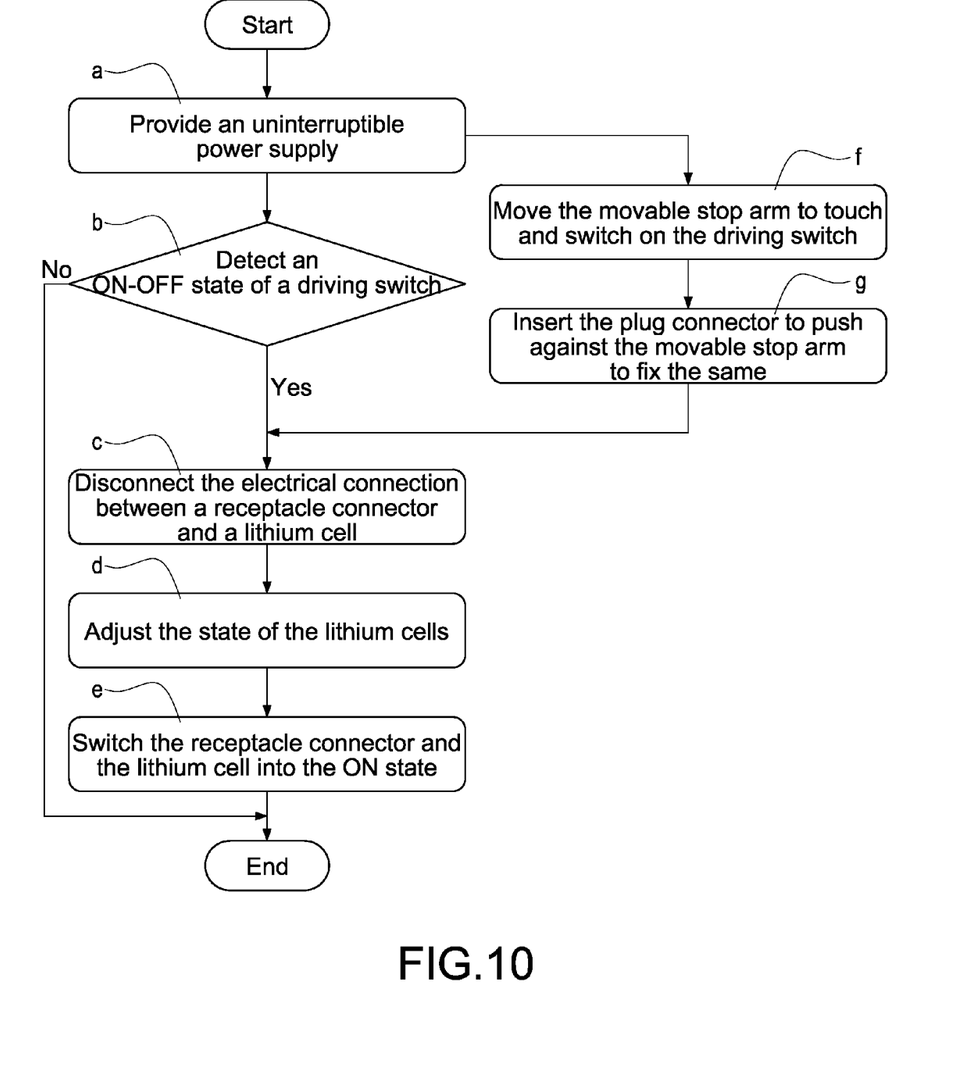
FIG. 10 is a flow chart of a charging-discharging method according to a second embodiment of the present invention.

Step a: An uninterruptible power supply, as that mentioned in the first embodiment, is provided, and the structure thereof is mentioned as follows. The uninterruptible power supply comprises a host computer 100, a power module 210, a receptacle connector 220, a driving switch 230, and a movable stop arm 240, a power wire 300, and a signal line 400. The power module 210 comprises a battery control unit 212 and at least one cell 213 electrically connected to the battery control unit 212. The receptacle connector 220 is electrically connected to each of the cells 213 via the battery control unit 212. The cell 213 is preferably a lithium cell. The driving switch 230 is electrically connected to the battery control unit 212, and the driving switch is switched off in its default setting. One end of the movable stop arm 240 blocks the receptacle connector 220 and is movable toward the driving switch 230 to touch and switch on the driving switch 230. The movable stop arm 240 is so resilient as to be restorable to its initial position to block the receptacle connector 220. One end of the power wire 300 is electrically connected to the host computer 100, and the other end of the power wire 300 includes a plug connector 310 for insertion into the receptacle 220. The signal line 400 is electrically connected between the battery control unit 212 and the host computer 100.

Step b: An ON-OFF state of the driving switch 230 is detected by means of the battery control unit 212. If it is detected that the driving switch 230 is in the default OFF state, the receptacle connector 220 does not perform electrical charging. If it is detected that the driving switch 230 is in the ON state, the movable stop arm 240 is commanded to move away from the receptacle connector 220. Therefore, the plug connector 310 can be inserted into the receptacle 220. Then, the method proceeds to a step c.

Step c: If it is detected that the driving switch 230 is switched on, the electrical connection between the receptacle connector 220 and the cell 213 is disconnected, thereby preventing the plug connector 310 from delivering electrical power with unsuitable power specification to the receptacle connector 220 to cause damages to the cell 213 after the plug connector 310 is inserted into the receptacle connector 220.

Step d: Following from the step c, the battery control unit 212 obtains the voltage state of the host computer 100 via the signal line 400 and adjusts the voltage state of the cells 213 to match the voltage state of the host computer 100.

Step e: Following from the step d, the battery control unit 212 switches the receptacle connector 220 and the cell 213 into the ON state, and the cell 213 starts operations, for example, the cell 213 supplying electrical power to the host computer 100 or the host computer 100 charging the cell 213.

The charging-discharging method comprises a step f and a step g which are selectively performed. Through the step f and the step g, the driving switch 230 can be touched to switch on. The two steps are described as follows.

Step f: Following from the step a, the movable stop arm 240 is moved away from the receptacle connector 220, so that the plug connector 310 can insert the receptacle connector 220. The movable stop arm 240 moves toward the driving switch 230 to touch and switch on the driving switch 230.

Step g: Following from the step f, the plug connector 310 is inserted into the receptacle connector 220. The plug connector 310 pushes against the movable stop arm 240 to fix the movable stop arm 240 and stop the same from restoring to its original position. Thereby, the movable stop arm 240 keep touching the driving switch 230 to maintain the same in the ON state.

Following from the step g, the aforesaid step b is carried out, wherein the battery control unit 212 detects that the driving switch 230 is in the on state. Then, the steps c to e are carried out sequentially, so that the host computer 100 starts operation after being electrically connected to the cell 213.

By means of the uninterruptible power supply, the battery assembly 200, and the charging-discharging method of the present invention, the circuit is adjusted to a suitable state before the plug connector 310 is inserted into the battery assembly 200, thereby preventing electrical power with unsuitable power specification from being delivered to the battery assembly 200 to cause damages to the cell 213.

It is to be understood that the above descriptions are merely preferable embodiments of the present invention and not intended to limit the scope of the present invention. Equivalent changes and modifications made in the spirit of the present invention are regarded as falling within the scope of the present invention.

What is claimed is:

1. A battery assembly, comprising:
    a power module including a battery control unit and at least one cell electrically connected to the battery control unit, the battery control unit controlling charging or discharging of the cell;
    a receptacle connector disposed in the power module and electrically connected to the cell via the battery control unit for the charging or discharging of each of the cells, the receptacle connector including an insertion opening;
    a driving switch disposed corresponding to the receptacle connector and electrically connected to the battery control unit, the driving switch driving the battery control unit to disconnect the electrical connection between the battery control unit and the cell when the driving switch is switched on, the driving switch being switched off in a default setting; and
    a movable stop arm, one end of the movable stop arm being outside of the insertion opening and blocking the same, the movable stop arm being movable toward the driving switch to touch and switch on the driving switch.

2. The battery assembly of claim 1, wherein the other end of the movable stop arm is fixed to the power module, so as to restrict the movable stop arm to be movable between the insertion opening and the driving switch.

3. The battery assembly of claim 1, wherein when the driving switch is switched on, the driving switch drives the battery control unit to disconnect the electrical connection between the cell and the receptacle connector.

4. The battery assembly of claim 1, wherein the movable stop arm is so resilient as to be restorable to its original position outside the insertion opening to block the same.

5. The battery assembly of claim 1, wherein the battery assembly comprises plural receptacle connectors and plural driving switches, each of the receptacle connectors is electrically connected to the cell via the battery control unit, and each of the driving switches is disposed corresponding to a respective one of the receptacle connectors and electrically connected to the battery control unit.

6. An uninterruptible power supply for connection between an electronic apparatus and a main power source, the uninterruptible power supply comprising:
    a power module including a battery control unit and at least one cell electrically connected to the battery control unit, the battery control unit controlling charging or discharging of the cell;
    a receptacle connector disposed at the power module and electrically connected to the cell via the battery control unit for the charging or discharging of each of the cells, the receptacle connector including an insertion opening;
    a driving switch disposed corresponding to the receptacle connector and electrically connected to the battery control unit, the battery control unit being driven to disconnect the electrical connection between the battery control unit and the cell when the driving switch is switched on, the driving switch being switched off in a default setting;
    a movable stop arm, one end of the movable stop arm being outside the insertion opening and blocking the same, the movable stop arm being movable toward the driving switch to touch and switch on the driving switch;
    a power wire, one end of the power wire including a plug connector adapted for insertion into the receptacle connector; and
    a host computer electrically connected to the electronic apparatus and the main power source, the other end of the power wire being electrically connected to the host computer, the host computer managing electrical power distribution among the main power source, the electronic apparatus, and the power module.

7. The uninterruptible power supply of claim 6, wherein the other end of the movable stop arm is fixed to the power module, so as to restrict the movable stop arm to be movable between the insertion opening and the driving switch.

8. The uninterruptible power supply of claim 6, wherein when the driving switch is switched on, the driving switch drives the battery control unit to disconnect the electrical connection between the cell and the receptacle connector.

9. The uninterruptible power supply of claim 6, wherein the movable stop arm is so resilient as to be restorable to its initial position outside the insertion opening to block the same.

10. The uninterruptible power supply of claim 6, further comprising a signal line connected to the battery control unit and the host computer, the signal line being provided for the battery control unit to obtain a voltage state of the host computer, the battery control unit controlling each of the cells to perform charging or discharging based on the voltage state of the host computer.

11. The uninterruptible power supply of claim 6, wherein the uninterruptible power supply comprises plural receptacle connectors and plural driving switches, each of the receptacle connectors is electrically connected to the cell via the battery control unit, and each of the driving switches is disposed corresponding to a respective one of the receptacle connectors and is electrically connected to the battery control unit.

12. The uninterruptible power supply of claim 6, wherein a lug is protrudingly disposed at a side surface of the plug connector, and when the plug connector is inserted into the receptacle connector, the lug pushes against the movable stop arm so as to switch on the driving switch.

13. The uninterruptible power supply of claim 12, wherein a through hole for insertion of a screw is formed on the lug, so as to screw the plug connector to the power module.

14. The uninterruptible power supply of claim 6, wherein each of the cells is a lithium cell.

15. A charging-discharging method of a battery assembly, comprising steps as follows:
    a. providing a power module, a receptacle connector, a driving switch, and a movable stop arm, the power module comprising a battery control unit and at least one cell electrically connected to the battery control unit, the receptacle connector being electrically connected to the cell via the battery control unit, the driving switch being electrically connected to the battery control unit, the driving switch being switched off in a default setting;

b. detecting an ON-OFF state of the driving switch by means of the battery control unit, and the method proceeding to a step c if it is detected that the driving switch is in the ON state.

c. disconnecting the electrical connection between the receptacle connector and the cell;

d. following from the step c, adjusting the voltage state of the cell by means of the battery control unit; and e. following from the step d, switching the receptacle connector and the cell into the ON state by means of the battery control unit.

16. The charging-discharging method of the battery assembly of claim 15, wherein in the step a, one end of the movable stop arm blocks the receptacle connector and is movable toward the driving switch to touch and switch on the driving switch, and the charging-discharging method of the battery assembly further comprises a step f: following from the step a, moving the movable stop arm away from the receptacle connector to touch and switch on the driving switch.

17. The charging-discharging method of the battery assembly of claim 16, wherein in the step a, a host computer and a power wire are provided, one end of the power wire is electrically connected to the host computer, the other end of the power wire includes a plug connector for insertion into the receptacle connector, and the charging-discharging method of the battery assembly further comprises a step g: following from the step f, inserting the plug connector into the receptacle connector, and pushing against the movable stop arm by the plug connector to maintain the driving switch in the ON state, so as to electrically connect the host computer to the cell.

18. The charging-discharging method of the battery assembly of claim 17, wherein in the step a, a signal line is provided, the signal line is electrically connected to the battery control unit and the host computer, and in the step d, the voltage state of the host computer is obtained via the signal line, and the voltage state of the cell is adjusted to match the voltage state of the host computer based on the voltage state of the host computer.

19. The charging-discharging method of the battery assembly of claim 17, wherein the movable stop arm is so resilient as to be restorable to its initial position to block the receptacle connector.

* * * * *